C. R. B. CLAFLIN
INDICATING DEVICE.
APPLICATION FILED MAY 11, 1908.
1,072,426.
Patented Sept. 9, 1913.
2 SHEETS—SHEET 1.
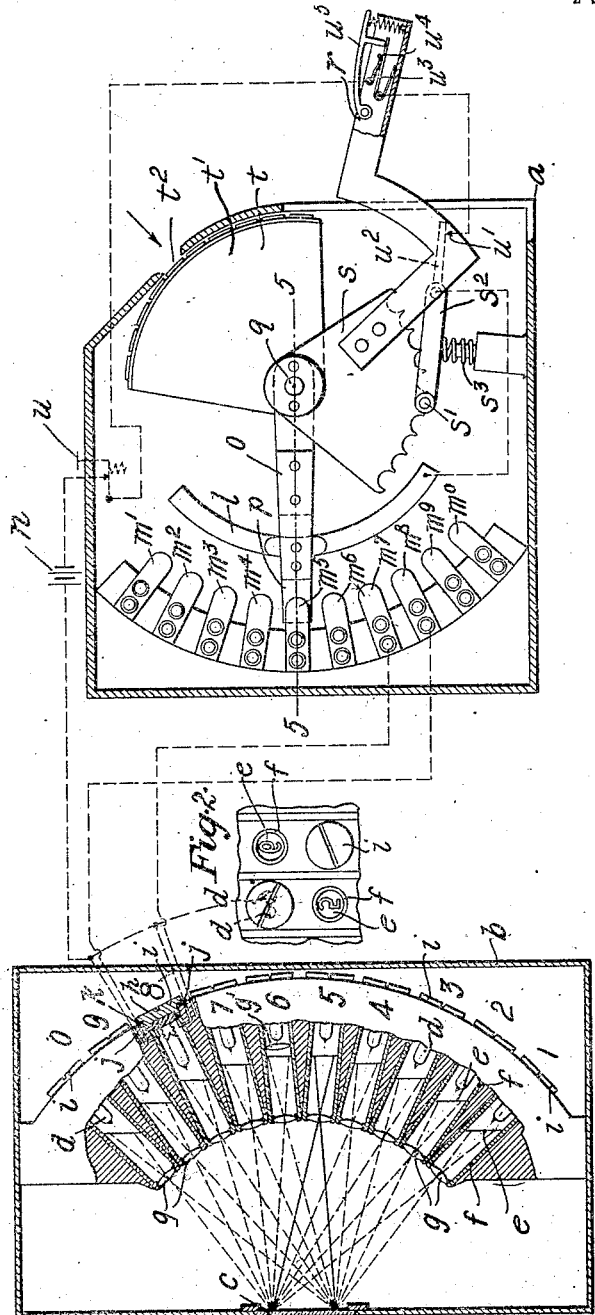
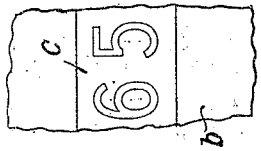
Witnesses:
Inventor:
Charles R. B. Claflin
by Emery Booth
Attys

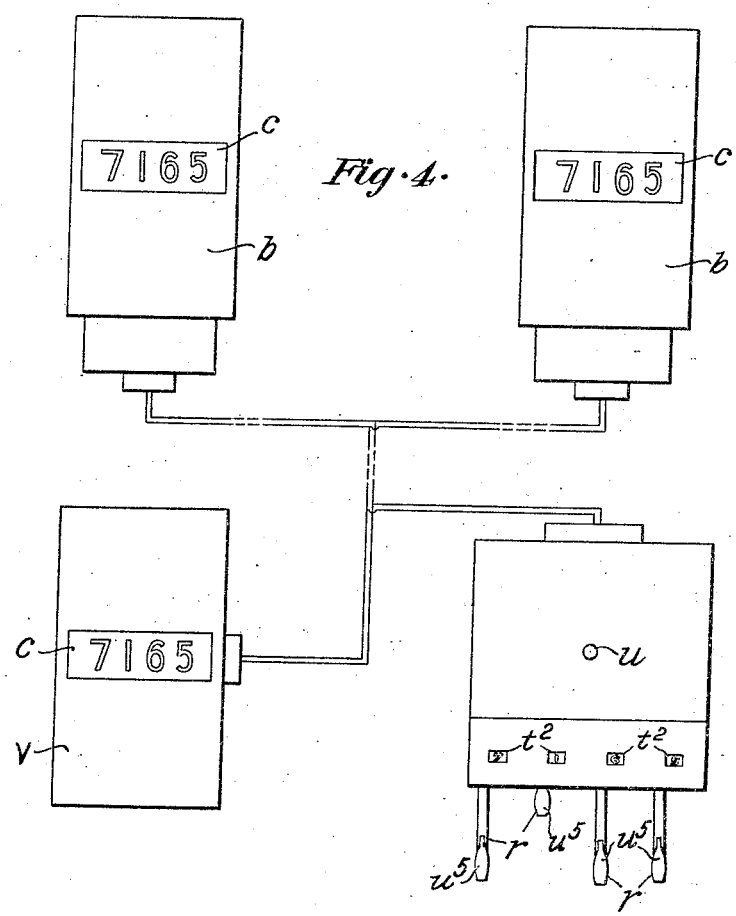

UNITED STATES PATENT OFFICE.

CHARLES R. B. CLAFLIN, OF BOSTON, MASSACHUSETTS, ASSIGNOR, BY MESNE ASSIGNMENTS, TO ATLANTIC NATIONAL BANK, OF PROVIDENCE, RHODE ISLAND, A CORPORATION OF RHODE ISLAND.

INDICATING DEVICE.

1,072,426.  Specification of Letters Patent.  Patented Sept. 9, 1913.

Application filed May 11, 1908. Serial No. 432,177.

*To all whom it may concern:*

Be it known that I, CHARLES R. B. CLAFLIN, a citizen of the United States, residing at Boston, in the county of Suffolk and State of Massachusetts, have invented an Improvement in Indicating Devices, of which the following description, in connection with the accompanying drawings, is a specification, like letters on the drawings representing like parts.

This invention relates to indicating devices, being more particularly concerned with indicating or signaling systems which are intended for the display of words, numbers, characters or other symbols or manifestations in response to the actuation of a suitable sending or operating device.

This invention, while in some respects applicable to other systems, is more particularly concerned with systems employing one or more groups of signaling or indicating devices, which, without necessary change in relative position, are caused to be selectively actuated so as to display one or more characters, symbols or other visual indication, and thereby convey desired information.

As illustrative of well-known indicators of this class may be mentioned one provided with one or more groups of image-creating devices, such, for example, as incandescent lamps provided each with a screen or other means for converting the light from its lamp when the latter is energized into a characteristic visual symbol, such, for example, as a digit or letter, and provided with means either nearby or at a distance for selectively energizing the individual members of the group. In systems of this class previously known to the prior art, the lamps of any one group, together with their screens or the like, have been arranged adjacent each other as, for example, in vertical lines and where a plurality of groups have been used, the groups have been arranged adjacent each other as, for example, in parallel vertical lines. The objection to this arrangement is that when several individual indicating devices from the various groups are simultaneously rendered effective for displaying a signal consisting of characters intended to be read together such, for example, as a number consisting of three or four figures, they are displayed in a scattered relation upon the field of vision, one number appearing perhaps near the top of one vertical line and the next consecutive number near the bottom of the next vertical line, so that not only is it difficult for the eye to readily take them in, but an additional effort is required mentally to assemble the disconnected numerals into a single number and receive the correct mental impression of the transmitted signal.

One object of my invention is to obviate this disadvantage, particularly in systems of this class, so that other advantages of such systems may be practically availed of.

This, and other objects and advantages of my invention, will be best understood by reference to the following description when taken in connection with the accompanying illustration of one specific embodiment thereof, while its scope will be more particularly pointed out in the appended claims.

In the drawings: Figure 1 is a view in partial section, partly diagrammatic and partly constructional, showing the sending and receiving devices of an indicating system embodying one form of my invention; Fig. 2 is a detail, partly broken away, showing a portion of the rear of the indicator; Fig. 3 is a detail showing a part of the front of the indicator; Fig. 4 is a view, partially diagrammatical, showing one application of the indicator illustrated in Fig. 1; Fig. 5 is a section, partly broken away, taken through the sending device shown in Fig. 1; and Fig. 6 is a view, partly broken away, showing the dial plate on the sending device, such view being shown as looking in the direction of the arrow in Fig. 1.

Referring to the drawings, particularly to Figs. 1 and 4, and to the embodiment of my invention which I have there selected for illustration, the same comprises a sending or actuating instrument *a* which is intended to transmit information to a station either near or remote, to be there displayed in the form of numbers, words, characters, symbols or other visual effects. In the system shown in Fig. 4 I have shown two similar receiving stations provided each with a receiving instrument designated *b*, such receiving instrument being equipped with means to display upon a suitable field or background, such as the plate *c*, preferably of translucent material as, for example, ground glass, one or more symbols for the conveyance of information.

While the receiving device may be variously constructed and may be equipped with means for producing various visual effects or displaying various symbols, all within the scope of my invention, in the illustrated form thereof the receiver is provided with four groups of image-creating devices having ten members each, corresponding to the ten digits, so that, by selectively rendering effective different members of the four groups, any number from 0 to 9999 may be displayed upon the plate c. Obviously this is illustrative only, the invention being capable of extension to any number of groups and any class of symbols or visual effects which may be desired.

While other means for creating the visual images of the numerals, such as are illustrated upon the screens in Fig. 4, may be employed, I have shown in Fig. 1, as illustrative of one embodiment of my invention, several groups of signaling devices comprising each a plurality of image-creating members combined with an actuating device at the sending end. In the specific construction shown the same consists of a series of light-producing devices, such as incandescent lamps d, provided each with a screen e suitably cut away, perforated or formed to produce an image in the form of the desired numeral or other symbol required when its particular lamp is lighted. In the illustrated case a plurality of lamps are used and both the lamps and the screens are fixed in position and the image is created by lighting the lamp. It is, however, obvious that various other expedients may be used for rendering the image-creating device effective, such, for example, as movable screens or movable lights as distinct from fixed screens and lights, or the use of a single lighting chamber as distinct from a plurality of such chambers.

In order to selectively display the several created images of one group upon substantially the same spot or area on the screen, without necessarily providing moving mechanism for entirely re-arranging the positions of the members of a group each time a different signal is displayed, I have provided means for directing the created images of the several groups upon the same spot on the screen and also for directing the created images for consecutive or adjacent groups, which are to be read consecutively, upon an adjacent spot upon the screen, so that, when they are displayed, consecutive images are seen in orderly and preferably horizontal alinement capable of being easily read and understood. While other ways of accomplishing this may be employed, in the illustrated form of my invention this object is achieved by placing the screens, each with its lamp, in a tube f, the tubes being arranged radially with reference to the center of the field of vision on the plate, and each screen being preferably parallel with the plate and provided with one or more lenses g coöperatively arranged within the tube f to focus the screened light passing from the lamp upon the plate, the arrangement being such that the image-creating devices of any one tier or group, such as the one shown in section in Fig. 1, direct the light upon substantially the same spot or area upon the plate.

In the illustrated case the lamp for the numeral 5 is supposed to be lighted so that the numeral 5 of the group in question is displayed upon the plate c, as seen in Fig. 3. If now the current is cut off from the lamp 5 and the lamp for the member 4 lighted, there will be displayed upon the plate the numeral 4 in precisely the same spot as the numeral 5 now appears.

In addition to the lens g, as shown in Fig. 1, condensing or other lenses may be employed as conditions may require, the apparatus in Fig. 1 being intended to show only a conventional lens arrangement. For example, in the tube for the number 6 I have shown a second or condensing lens g' between the screen and the lamp, and such arrangement, if desired, might be adopted for all the members of the group.

While other associated groups of image-creating devices may be positioned where desired for convenience and simplicity, I have shown them arranged in the casing side by side, as represented in Fig. 2, and separated by any suitable walls or partitions. It will be understood that the individual members of other groups are positioned relatively to each other, substantially the same as described in connection with the first group referred to, each being constructed as previously described to direct its image upon the same area on the plate c, preferably immediately adjacent the spot where the images from the next adjacent group are displayed. While obviously the images from the adjacent groups might be displayed in vertical alinement, or in any other desired arrangement, preferably, as shown, for simplicity in reading, they are arranged in orderly consecutive horizontal alinement, so that they can be easily distinguished.

The lamps may be held in position by any desired means and may be arranged in various ways. In the receiver shown in Fig. 1 each tube is provided with a plurality of lamps d (see Fig. 2), herein two in number, which are preferably connected in multiple and supported upon the insulating block h, the latter secured to the threaded metallic plug i which is removably secured in the end of the tube. The lamp terminals, secured to the insulating block h, may be made automatically to contact with suitable fixed positive and negative terminals j and k, which latter are, in turn, permanently connected to the sender $a$.

I preferably employ two or more lamps for each member of the group, this being useful as a precautionary measure, for, if one lamp is burned out, there will still be enough light from the remaining lamp to display the signal, while, at the same time its diminished light will notify the attendant at the receiver of the fault and the latter can have it immediately rectified.

Any suitable construction of circuit closing device may be employed at the sending station, the one shown in the drawings being illustrative only. As shown in Fig. 1, the same consists of a contact segment $l$ arranged in juxtaposition to a series of ten pairs of contacts $m'$, $m^2$ to $m^0$. The segment $l$ may be connected through any suitable source, such as the battery $n$ with all the positive terminals of the lamp, while the contacts $m'$, etc., are connected individually to the corresponding responsive negative lamp terminals. To avoid complications, these are not shown in detail in Fig. 1, but they will be readily understood from the illustrative connections which are shown as carried out to the terminals of the members 7 and 8 from the receiving apparatus.

The various contact pairs are adapted to be selectively connected to the segment $l$ and their respective image-creating devices thereby rendered selectively effective by movement of a switch arm $o$ carrying a bridging contact $p$ engaging the said segment $l$ and the contact $m$. The switch arm $o$ is mounted as upon the pin $q$ and adapted to be turned manually or otherwise in any desired way, as by the handle $r$ secured to the segment $s$. Suitable means may be provided for assisting the positioning of the arm over any given segment and for locating it there when positioned, and as illustrative of such, the edge of the segment is shown suitably notched and engaged by the roller $s'$ carried upon the pivoted arm $s^2$ and pressed into engagement with the segment by the coil spring $s^3$. In order also that the sending operator may see before him the symbol which, through manipulation of the handle $r$, he is simultaneously displaying on the plate $c$, there may be provided a member $t$ fixedly secured to the switch arm $o$ and carrying a plate or segment $t'$, upon the face of which are displayed the numerals or other symbols adapted to be displayed at the receiver and arranged in the same consecutive order as the contacts $m'$ to $m^0$. As the segmental plate $t'$ moves about, the number corresponding to the segment then engaged by the arm, is visible to the operator through an opening $t^2$ in the wall of the casing $a$.

As it will be understood, as shown in Fig. 4, there is provided a separate transmitting handle $r$ and a separate switch arm $o$ and a separate set of contacts for each group of image-creating devices, which may be independently manipulated so that any selected number in a group may be displayed.

The several segments $l$ for the different groups may, if desired, be connected in multiple and connected by a single conductor to the positive terminals of all the lamps of all the groups. If desired, the cutout switch, shown embodied in the push button $u$, may be employed, so as to render the receiver ineffective until, by manipulation of the several handles, the desired signal is set. Preferably, however, either with or without the push button, the main circuit for each group of signal devices is caused to pass, as shown in Fig. 1, through the fixed contact $u'$ and the movable contact arm $u^2$, the latter connected to the arm $s^2$, so that, as the roller $s'$ enters a notch, indicating that the switch arm has engaged one of the contacts $m$, the circuit is made at $u^2$, but at the other times broken. The circuit also passes through contacts $u^3$ and $u^4$, so arranged in the handle that when the handle is gripped the gripping piece $u^5$, being pressed inwardly, the contacts are separated, thereby breaking the circuit. When, however, the grip is released, the circuit is again established. It therefore follows that in changing from one number to another the circuit is broken and will not be again made until the handle is released with the roller $s'$ resting in one of the notches. This prevents arcing at the contacts and unintelligible flashes at the indicator.

While any indefinite variety of applications of this invention may be made, in Fig. 4 I have shown one simple illustration of its use, the same being shown as employed in connection with a system of range signaling for use on shipboard. For this purpose there is provided a receiving device $b$ at each gun station, the numerals on which are intended to display the range in yards as determined at a central station and as transmitted from the sending station at which the sending device $a$ is located. In this system the corresponding individual receiving devices at the several stations are connected in multiple, so that they simultaneously display the same numeral as selected at the sending device $a$. Connected also in multiple with the receiving instrument $b$, but located at or adjacent the sending device $a$, is a tell-tale indicator $v$, which may be of substantially the same construction as the indicator $b$, but which is utilized to display to the nearby sending operator the transmitted signal as it is displayed at the distant receiver. If, therefore, an error is made in reading the dial on the transmitter, the mistake will be quickly seen from the tell-tale indicator.

To avoid complication, the connections in detail are not shown in Fig. 4, but they will be readily understood without further description.

Obviously the above application of my invention may be extended by the employment of additional indicators and the utilization of other transmitting devices, for transmitting signals of different nature, but the general principles of my invention will be understood from the foregoing description.

While I have shown and described for the purpose of illustration one specific form of my invention, it is to be understood that the same is not limited to the details of construction or to the particular application herein made thereof, but that extensive deviations from the illustrated form may be made without departing from the spirit of the invention.

Claims.

1. In an indicator a group of image-creating devices, comprising separate members, each with means to display upon substantially the same spot on a suitable field or background a characteristic visual signal, and relatively remote means for selectively rendering effective any one of said devices at will.

2. In an indicator the combination with a plurality of groups of image-creating devices, each group comprising separate members each with means to display upon substantially the same spot on a suitable field or background a characteristic visual signal, of means for selectively rendering effective a device of one group simultaneously with a device of another group.

3. In an indicator the combination with a plurality of groups of image-creating devices, each group comprising separate members each with means to display upon substantially the same spot on a suitable field or background a characteristic image, the images of consecutive groups being related to one another and directed upon said field in consecutive orderly alinement, of means for selectively rendering effective a device of one group simultaneously with a selected device of another group.

4. In an indicator the combination with a plurality of groups of signaling devices, each group comprising a plurality of light-creating members, provided each with coöperating associated members to produce from the light thereof a characteristic lighting effect, means for directing the light produced by the devices of any one group upon substantially the same spot on a suitable field or background, the signals of consecutive groups being directed upon said field in consecutive orderly alinement, of means for selectively energizing individual members of the several groups, thereby to display upon the field of vision in orderly alinement selected signals of the several groups.

5. In an indicator the combination with a plurality of groups of signaling devices, each group comprising a plurality of electric lamps, each lamp being provided with a suitably constructed screen to form coöperatively therewith a characteristic image, and means for directing the images produced by the lamps of any one group upon substantially the same spot on a suitable field or background, the images of consecutive groups directed upon said field in consecutive orderly alinement, of means for selectively energizing individual lamps of the several groups, thereby to display upon the field of vision in orderly alinement the selected symbols of the several groups.

6. In an indicator the combination with a plurality of groups of signaling devices, each group comprising a plurality of electric lamps, each lamp being provided with a suitably constructed screen to form coöperatively therewith a characteristic image, and tubular casings each provided with one or more suitable lenses for directing the images formed by the lamps of any one group upon substantially the same spot on a suitable field or background, the images of consecutive groups being directed upon said field in substantially horizontal alinement, of a switch for each of said groups of lamps for selectively energizing individual members of the said groups, thereby to display upon the field of vision in horizontal alinement the selected images of the several groups.

7. In an indicator a group of signaling devices comprising a plurality of electric lamps, each lamp being provided with a suitably constructed screen to form coöperatively therewith a characteristic image, and provided also each with a tubular casing having one or more suitable lenses, said casings being arranged to converge upon substantiallly the same spot on a suitable field or background and means for selectively energizing one at a time the individual lamps of the group.

8. In an indicating system the combination with a receiving instrument comprising groups of separate image-creating devices and means for directing the images produced by the different members of the several groups in substantially the same orderly alinement upon a suitable field or background, of a sending instrument operatively associated with said receiving instrument but relatively remote therefrom, said sending instrument having means for selectively rendering effective a device of one group simultaneously with a device of another group and a second indicating instrument operatively associated with said sending instrument and relatively near the same, said second instrument also having groups of separate image-creating devices and means for directing the images produced by the different members of the several groups in substantially the same alinement upon a suitable field or background and being actuated by said sending instrument simultaneously with said first receiving instrument, the said field or background of said second instrument being visible from said sending instrument.

9. In an indicator the combination with a group of signaling devices comprising a plurality of separate image-creating devices each with means to display upon substantially the same spot on a suitable field or background a characteristic visual signal, of means for selectively rendering effective any one of said devices at will to display a given image and a tell-table device located adjacent said selective means for simultaneously displaying the same image.

10. In an indicating system a plurality of indicators having each a plurality of groups of signaling devices, each group comprising a plurality of electric lamps, each lamp being provided with coöperatively associated means to produce from the light thereof a characteristic lighting effect, means for directing the light produced by the devices of any one group upon substantially the same spot on a suitable field or background, the signals of consecutive groups being directed upon said field in consecutive orderly alinement and means connected in multiple with said several indicators for selectively energizing individual members of the several groups at each indicator thereby simultaneously to display at each indicator upon the field of vision thereof in orderly alinement the selected signals of the several groups.

In testimony whereof, I have signed my name to this specification, in the presence of two subscribing witnesses.

CHARLES R. B. CLAFLIN.

Witnesses:
   THOMAS B. BOOTH,
   EVERETT S. EMERY.